US011573735B2

(12) United States Patent
Garcia et al.

(10) Patent No.: US 11,573,735 B2
(45) Date of Patent: Feb. 7, 2023

(54) TECHNOLOGIES FOR MEDIA MANAGEMENT IN COLUMN-ADDRESSABLE MEMORY MEDIA SYSTEMS

(71) Applicant: Intel Corporation, Santa Clara, CA (US)

(72) Inventors: Rowel Garcia, North Plains, OR (US); Jawad Khan, Portland, OR (US); Richard Mangold, Forest Grove, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/854,392

(22) Filed: Apr. 21, 2020

(65) Prior Publication Data

US 2020/0257472 A1     Aug. 13, 2020

(51) Int. Cl.
*G06F 3/06*     (2006.01)

(52) U.S. Cl.
CPC .......... *G06F 3/0659* (2013.01); *G06F 3/0604* (2013.01); *G06F 3/0673* (2013.01)

(58) Field of Classification Search
CPC ..... G06F 3/0659; G06F 3/0604; G06F 3/0673
See application file for complete search history.

(56) References Cited

U.S. PATENT DOCUMENTS

| | | | |
|---|---|---|---|
| 4,815,010 A * | 3/1989 | O'Donnell | G09G 5/14 345/531 |
| 5,758,056 A | 5/1998 | Barr | |
| 6,000,006 A * | 12/1999 | Bruce | G06F 11/1068 711/103 |
| 7,620,792 B2 * | 11/2009 | Maupin | G06F 12/0207 711/202 |
| 2008/0034154 A1 | 2/2008 | Lee et al. | |
| 2016/0352358 A1 * | 12/2016 | Ordentlich | H03M 13/47 |

(Continued)

FOREIGN PATENT DOCUMENTS

WO     2006132939 A2     12/2006

OTHER PUBLICATIONS

European Search Report for EPO Patent Application No. 20216296.2, dated Jun. 29, 2021, 10 pages.

*Primary Examiner* — Gary W. Cygiel
(74) *Attorney, Agent, or Firm* — Jordan IP Law, LLC (57) ABSTRACT

Technologies for media management for column-based memory systems include a memory controller including an indirection table. The memory controller receives a memory access to a column-addressable memory indicative of a memory row address. The memory controller determines a logical sub-block identifier based on the memory row address and looks up a physical sub-block identifier in the indirection table. The memory controller issues a redirected memory access indicative of the physical sub-block identifier to the column-addressable memory. The memory access may include a column read. The memory controller may perform a media management operation by copying or moving data from a source physical sub-block to a destination physical sub-block. The memory controller updates the indirection table with the destination physical sub-block for the associated logical sub-block identifier. Other embodiments are described and claimed.

24 Claims, 7 Drawing Sheets

(56) References Cited

U.S. PATENT DOCUMENTS

2019/0079681 A1 3/2019 Trika et al.
2019/0146717 A1 5/2019 Khan et al.
2019/0206487 A1* 7/2019 Chen .................. G11C 13/0007

* cited by examiner

TECHNOLOGIES FOR MEDIA MANAGEMENT IN COLUMN-ADDRESSABLE MEMORY MEDIA SYSTEMS

BACKGROUND

In many compute operations, such as matrix operations (e.g., matrix multiplication), data is manipulated by a compute device in rows and columns. Two formats for storing matrix data in memory are row-major format and column-major format. In row-major format, consecutive elements of the rows of the matrix are contiguous in memory. Conversely, in column-major format, consecutive elements of the columns are contiguous. Performing a matrix multiplication involves reading a given matrix in row-major format, reading another matrix in column-major format, and multiplying the respective rows and columns with one another. Often, the memory may store matrices in either row-major or column-major format and convert the matrix as needed during an operation. However, doing so increases latency and computational cost. As an alternative, a matrix may be stored in both row-major and column-major formats, but doing so increases memory usage.

Certain memory technologies may allow individual columns (e.g., bits) of data to be directly addressed. In those technologies, an entire column of data may be read and/or written in a single operation. For example, certain types of stochastic associative memory (SAM) may allow for both row and column-wise reads with similar latency.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Figure 1:
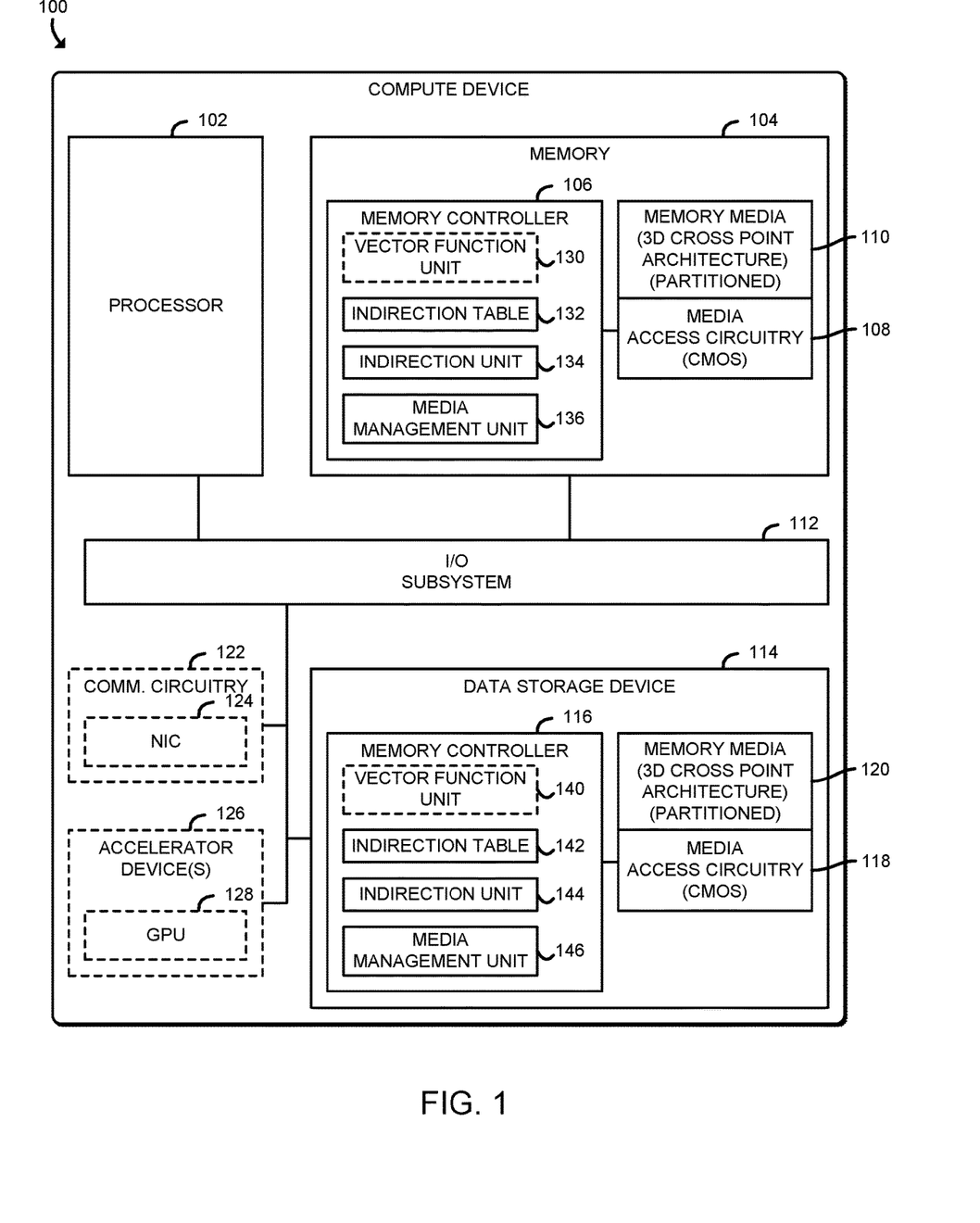
FIG. 1 is a simplified diagram of at least one embodiment of a compute device for performing media management for column-addressable memory media.

Referring now to FIG. 1, a compute device 100 for performing media management with column-addressable memory includes a processor 102, a memory 104, an input/output (I/O) subsystem 112, a data storage device 114, communication circuitry 122, and one or more accelerator devices 126. Of course, in other embodiments, the compute device 100 may include other or additional components, such as those commonly found in a computer (e.g., a display, peripheral devices, etc.). Additionally, in some embodiments, one or more of the illustrative components may be incorporated in, or otherwise form a portion of, another component. The term "memory," as used herein in reference to performing media management may refer to the memory 104 and/or the data storage device 114, unless otherwise specified. As explained in more detail herein, memory controllers 106, 116 coupled to a corresponding memory media 110, 120 (e.g., any device or material that data is written to and read from) via corresponding media access circuitry 108, 118 (e.g., any circuitry or device configured to access and operate on data in the corresponding memory media 110, 120) may perform various memory indirection operations for memory access and media management operations.

As described further below, the memory controllers 106, 116 may perform media management operations to protect against premature wear of the corresponding memory media 110, 120. For example, certain memory media technologies may degrade when repeated memory accesses are performed to the same physical memory ranges. Accordingly, the memory controllers 106, 116 may identify repeated accesses to the same physical memory range (e.g., due to malicious activity, programming errors, application data access patterns, or otherwise) and after a threshold number of accesses or other criteria are exceeded, the memory controllers 106, 116 may move the associated data to a different physical memory range within the corresponding memory media 110, 120. By performing indirection as described herein, the memory 104, 114 may perform such media management at a sub-block granularity, without corrupting data stored in a format that may be accessed column-wise.

The processor 102 may be embodied as any device or circuitry (e.g., a multi-core processor(s), a microcontroller, or other processor or processing/controlling circuit) capable of performing operations described herein, such as executing an application (e.g., an artificial intelligence related application that may utilize a neural network or other machine learning structure to learn and make inferences). In some embodiments, the processor 102 may be embodied as, include, or be coupled to an FPGA, an application specific integrated circuit (ASIC), reconfigurable hardware or hardware circuitry, or other specialized hardware to facilitate performance of the functions described herein.

The memory 104, which may include a non-volatile memory (e.g., a far memory in a two-level memory scheme), includes the memory media 110 and the media access circuitry 108 (e.g., a device or circuitry, such as a processor, application specific integrated circuitry (ASIC), or other integrated circuitry constructed from complementary metal-oxide-semiconductors (CMOS) or other materials) underneath (e.g., at a lower location) and coupled to the memory media 110. The media access circuitry 108 is also connected to the memory controller 106, which may be embodied as any device or circuitry (e.g., a processor, a co-processor, dedicated circuitry, etc.) configured to selectively read from and/or write to the memory media 110 in response to corresponding requests (e.g., from the processor 102 which may be executing a column read or other column-wise operation).

The memory media 110, in the illustrative embodiment, has a three dimensional cross point architecture that has data access characteristics that differ from other memory architectures (e.g., dynamic random access memory (DRAM)), such as enabling access to one bit per tile and incurring time delays between reads or writes to the same partition or other partitions. The media access circuitry 108 is configured to make efficient use (e.g., in terms of power usage and speed) of the architecture of the memory media 110, such as by accessing multiple tiles in parallel within a given partition, utilizing scratch pads (e.g., relatively small, low latency memory) to temporarily retain and operate on data read from the memory media 110, and broadcasting data read from one partition to other portions of the memory 104 to enable matrix calculations (e.g., tensor operations) to be performed in parallel within the memory 104. Additionally, in the illustrative embodiment, instead of sending read or write requests to the memory 104 to access matrix data, the processor 102 may send a higher-level request (e.g., a top n similarity search query request or other stochastic associative search request) and provide the locations of the input data to be utilized in the requested operation (e.g., an input query). Further, rather than sending back the resulting data to the processor 102, the memory 104 may merely send back an acknowledgement or other indication of status (e.g., "Done"), indicating that the requested operation has been completed. As such, many compute operations, such as artificial intelligence operations (e.g., stochastic associative searches) can be performed in memory (e.g., in the memory 104 or in the data storage device 114), with minimal usage of the bus (e.g., the I/O subsystem) to transfer data between components of the compute device 100 (e.g., between the memory 104 or data storage device 114 and the processor 102). In some embodiments the media access circuitry 108 is included in the same die as the memory media 110. In other embodiments, the media access circuitry 108 is on a separate die but in the same package as the memory media 110. In yet other embodiments, the media access circuitry 108 is in a separate die and separate package but on the same dual in-line memory module (DIMM) or board as the memory media 110.

Figure 2:
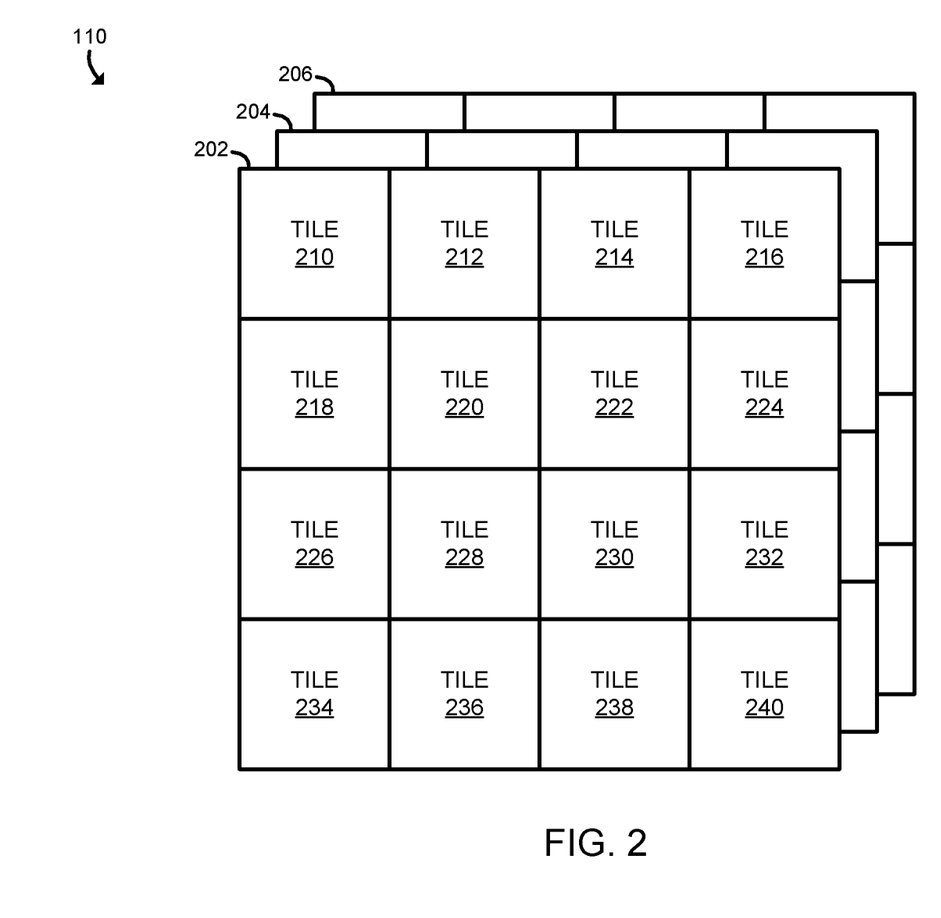
FIG. 2 is a simplified diagram of at least one embodiment of a memory media included in the compute device of FIG. 1.

Referring briefly to FIG. 2, the memory media 110, in the illustrative embodiment, includes a tile architecture, also referred to herein as a cross point architecture (e.g., an architecture in which memory cells sit at the intersection of word lines and bit lines and are individually addressable and in which bit storage is based on a change in bulk resistance), in which each memory cell (e.g., tile) 210, 212, 214, 216, 218, 220, 222, 224, 226, 228, 230, 232, 234, 236, 238, 240 is addressable by an x parameter and a y parameter (e.g., a column and a row). The memory media 110 includes multiple partitions, each of which includes the tile architecture. The partitions may be stacked as layers 202, 204, 206 to form a three dimensional cross point architecture (e.g., Intel 3D XPoint™ memory). Unlike typical memory devices, in which only fixed-size multiple-bit data structures (e.g., byte, words, etc.) are addressable, the media access circuitry 108 is configured to read individual bits, or other units of data, from the memory media 110 at the request of the memory controller 106, which may produce the request in response to receiving a corresponding request from the processor 102.

Figure 3:
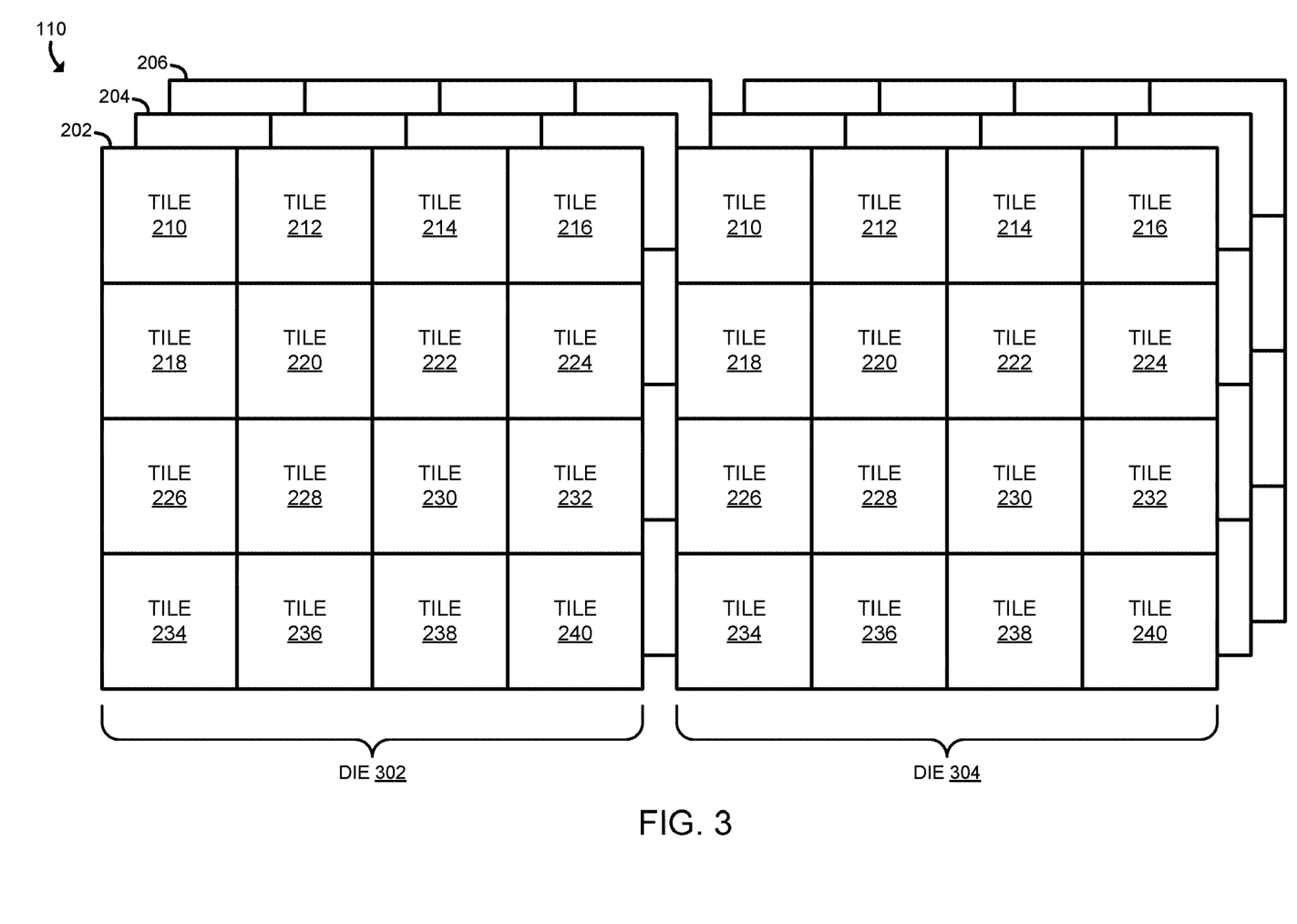
FIG. 3 is a simplified diagram of at least one embodiment of a memory media having multiple dies included in the compute device of FIG. 1.

Referring briefly to FIG. 3, in some embodiments the memory media 110 may include multiple dies 302, 304 in each of the partitions 202, 204, 206. Each die 302, 304 includes addressable memory cells (e.g., tiles) 210, 212, 214, 216, 218, 220, 222, 224, 226, 228, 230, 232, 234, 236, 238, 240. The multiple dies 302, 304 may be incorporated in a single DIMM or board. In some embodiments, the dies 302, 304 may be accessed in parallel, for example using a single command/address (CA) bus. Additionally, although illustrated as including two dies 302, 304 it should be understood that in other embodiments the memory media 110 may include a different number of dies, such as eight dies, 11 dies, or another number of dies.

Referring back to FIG. 1, the memory controller 106, in the illustrative embodiment, includes an indirection table 132, an indirection unit 134, a media management unit 136, and, in some embodiments, a vector function unit 130. The vector function unit 130 may be embodied as any device or circuitry of the memory controller 106 (e.g., software, firmware, and/or hardware) configured to offload tasks from the host processor 102 by performing vector-based operations in hardware. The indirection table 132 may be embodied as any volatile or non-volatile memory, data storage, or other data included in or otherwise accessible to the memory controller 106. As described further below, the indirection table 132 associates logical sub-block (s-block) identifiers to physical s-block identifiers and records write timestamps for physical s-blocks. The memory controller 106 may include a single indirection table 132 or in some embodiments may include an indirection table 132 for every die of the memory medium 110.

The indirection unit 134 is configured to receive a memory access indicative of a memory row address, determine a logical s-block identifier as a function of the memory row address, look up a physical s-block identifier based on the logical sub-block identifier in the indirection table 132; and issue a redirected memory access to the memory medium 110. The redirected memory access is indicative of the physical s-block identifier. The indirection unit 134 may be further configured to update the indirection table 132 with a write timestamp associated with the physical s-block identifier in response to issuing the redirected memory access.

The media management unit 136 is configured to identify a source physical s-block identifier and a destination physical s-block identifier for a media management operation and identify a logical s-block identifier associated with the source physical s-block identifier using the indirection table 132. The media management unit 136 is further configured to perform the media management operation and to update the indirection table 132 with the destination physical s-block identifier for the logical s-block identifier in response to performing the media management operation. The media management unit 136 may be further configured to update the indirection table 132 with a write timestamp associated with the destination physical s-block identifier in response to performing of the media management operation.

Referring back to FIG. 1, the memory 104 may include non-volatile memory and volatile memory. The non-volatile memory may be embodied as any type of data storage capable of storing data in a persistent manner (even if power is interrupted to the non-volatile memory). For example, the non-volatile memory may be embodied as one or more non-volatile memory devices. The non-volatile memory devices may include one or more memory devices configured in a cross point architecture that enables bit-level addressability (e.g., the ability to read from and/or write to individual bits of data, rather than bytes or other larger units of data), and are illustratively embodied as three dimensional (3D) cross point memory. In some embodiments, the non-volatile memory may additionally include other types of memory, including any combination of memory devices that use chalcogenide phase change material (e.g., chalcogenide glass), ferroelectric transistor random-access memory (FeTRAM), nanowire-based non-volatile memory, phase change memory (PCM), memory that incorporates memristor technology, Magnetoresistive random-access memory (MRAM) or Spin Transfer Torque (STT)-MRAM. The volatile memory may be embodied as any type of data storage capable of storing data while power is supplied volatile memory. For example, the volatile memory may be embodied as one or more volatile memory devices, and is periodically referred to hereinafter as volatile memory with the understanding that the volatile memory may be embodied as other types of non-persistent data storage in other embodiments. The volatile memory may have an architecture that enables bit-level addressability, similar to the architecture described above.

The processor 102 and the memory 104 are communicatively coupled to other components of the compute device 100 via the I/O subsystem 112, which may be embodied as circuitry and/or components to facilitate input/output operations with the processor 102 and/or the main memory 104 and other components of the compute device 100. For example, the I/O subsystem 112 may be embodied as, or otherwise include, memory controller hubs, input/output control hubs, integrated sensor hubs, firmware devices, communication links (e.g., point-to-point links, bus links, wires, cables, light guides, printed circuit board traces, etc.), and/or other components and subsystems to facilitate the input/output operations. In some embodiments, the I/O subsystem 112 may form a portion of a system-on-a-chip (SoC) and be incorporated, along with one or more of the processor 102, the main memory 104, and other components of the compute device 100, in a single chip.

The data storage device 114 may be embodied as any type of device configured for short-term or long-term storage of data such as, for example, memory devices and circuits, memory cards, hard disk drives, solid-state drives, or other data storage device. In the illustrative embodiment, the data storage device 114 includes a memory controller 116, similar to the memory controller 106, memory media 120 (also referred to as "storage media"), similar to the memory media 110, and media access circuitry 118, similar to the media access circuitry 108. As shown, the memory controller 116 includes an indirection table 142, similar to the indirection table 132, an indirection unit 144, similar to the indirection unit 134, a media management unit 146, similar to the media management unit 136, and, in some embodiments, a vector function unit 140, similar to the vector function unit 130. The data storage device 114 may include a system partition that stores data and firmware code for the data storage device 114 and one or more operating system partitions that store data files and executables for operating systems.

The communication circuitry 122 may be embodied as any communication circuit, device, or collection thereof, capable of enabling communications over a network between the compute device 100 and another device. The communication circuitry 122 may be configured to use any one or more communication technology (e.g., wired or wireless communications) and associated protocols (e.g., Ethernet, Bluetooth®, Wi-Fi®, WiMAX, etc.) to effect such communication.

The illustrative communication circuitry 122 includes a network interface controller (NIC) 124, which may also be referred to as a host fabric interface (HFI). The NIC 124 may be embodied as one or more add-in-boards, daughter cards, network interface cards, controller chips, chipsets, or other devices that may be used by the compute device 100 to connect with another compute device. In some embodiments, the NIC 124 may be embodied as part of a system-on-a-chip (SoC) that includes one or more processors, or included on a multichip package that also contains one or more processors. In some embodiments, the NIC 124 may include a local processor (not shown) and/or a local memory (not shown) that are both local to the NIC 124. In such embodiments, the local processor of the NIC 124 may be capable of performing one or more of the functions of the processor 102. Additionally or alternatively, in such embodiments, the local memory of the NIC 124 may be integrated into one or more components of the compute device 100 at the board level, socket level, chip level, and/or other levels.

The one or more accelerator devices 126 may be embodied as any device(s) or circuitry capable of performing a set of operations faster than the general purpose processor 102. For example, the accelerator device(s) 126 may include a graphics processing unit 128, which may be embodied as any device or circuitry (e.g., a co-processor, an ASIC, reconfigurable circuitry, etc.) capable of performing graphics operations (e.g., matrix operations) faster than the processor 102.

Figure 4:
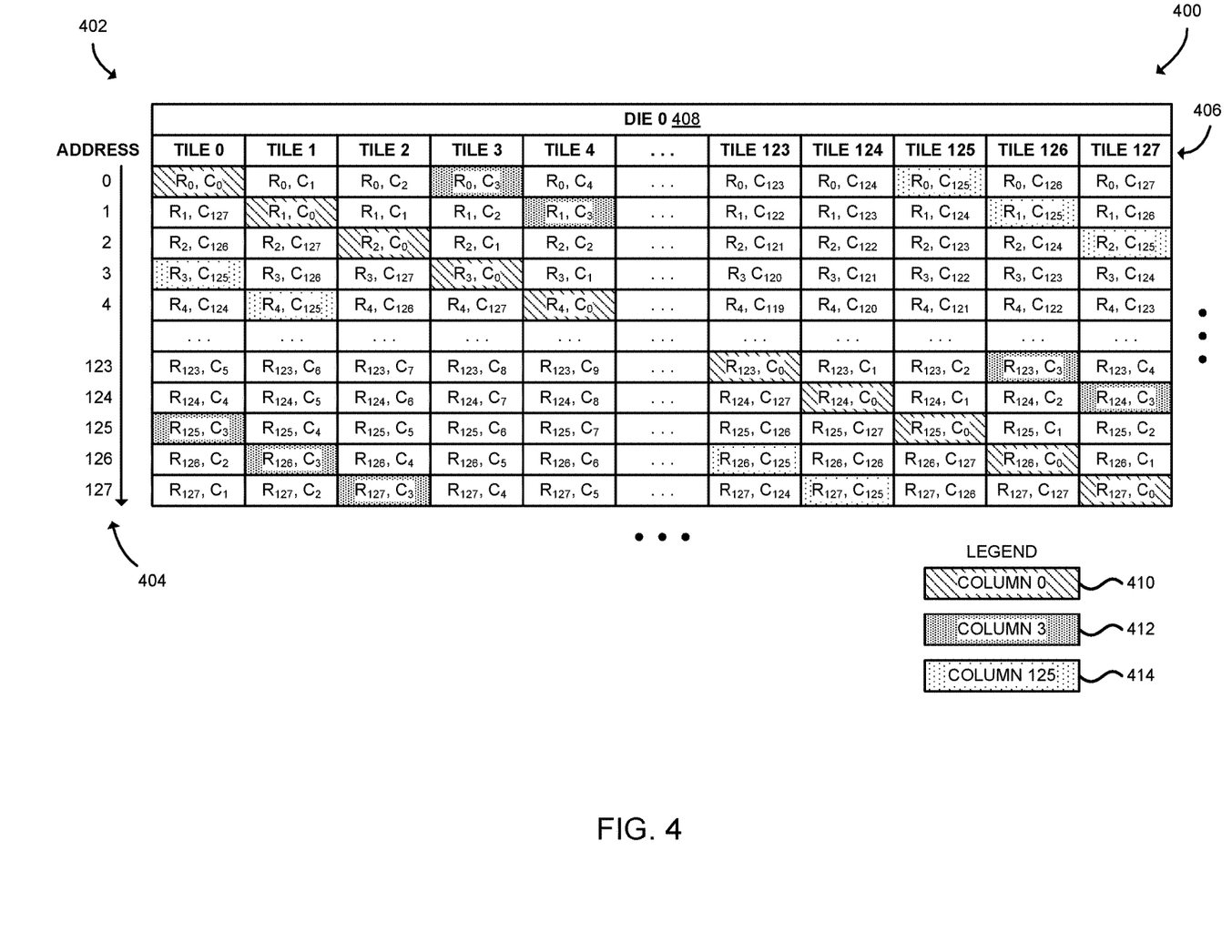
FIG. 4 is a schematic diagram illustrating a memory layout of a physical sub-block of a memory of the computing device of FIG. 1.

Referring now to FIG. 4, schematic diagram 400 illustrates a block of data that may be stored in the memory media 110 for column-based access. The diagram 400 shows a physical sub-block (s-block) 402, which includes a contiguous block in the memory media 110 including a number of rows 404 and columns 406. As shown, the s-block 402 includes 128 rows 404, and each row 404 includes 128 columns 406. Each column 406 is illustratively a tile that includes a single bit. Thus, the illustrative s-block 402 may include 2048 bytes (2 kB) of column-based data. Although illustrated as a 128 by 128 block, it should be understood that in other embodiments the physical s-block 402 may have a different size. For example, in some embodiments, the physical s-block 402 may be a contiguous block of memory that may be accessed with a single column-wise access operation (e.g., a column read).

Data stored in the s-block 402 is included in a logical matrix. Thus, each bit has a logical row number and a logical column number. As shown, row number zero includes columns zero through 127 arranged in order. For each subsequent row 404 in the s-block 402, the columns 406 are rotated one bit position. Accordingly, the logical columns are arranged diagonally in the s-block. For example, as illustrated in FIG. 4, diagonal cells 410 include logical column 0, diagonal cells 412 include logical column 3, and diagonal cells 414 include logical column 125. Although FIG. 4 highlights three logical columns 410, 412, 414, it should be understood that each logical column in the s-block 402 is arranged diagonally. Thus, in the s-block 402, in a given logical column (e.g., a column of a multi-dimensional matrix of data), each bit is in a different physical row and physical column than any other bit in that logical column.

Each logical column of data may be accessed with a column-based operation (e.g., column read or column write). By arranging the data of the logical columns as described herein, the compute device 100 may perform memory accesses (e.g., writes and/or reads) that avoid a latency that would otherwise occur as the memory media 110 performs a physical state change (e.g., a cool-down process) at the physical row and column that was just accessed, before the next bit of data within that same row and/or column is accessible. Further, to provide additional efficiency in terms of manufacturing cost and physical die size (e.g., number of logic gates), in the illustrative embodiment, the logical columns are arranged diagonally across the physical rows and columns. Arranging each logical column diagonally simplifies the mathematical operations involved in addressing the underlying physical tiles (e.g., using rotation and modulus operators), as compared to other patterns of distributing the bits in a given logical column across the underlying physical rows and columns. It should be noted that data in each row 404 is rotated by a predetermined amount based on the relative row offset within the s-block 402. Thus, relocating, substituting, or otherwise moving individual rows 404 within the s-block 402 may cause data corruption for column-based data.

Figure 5:
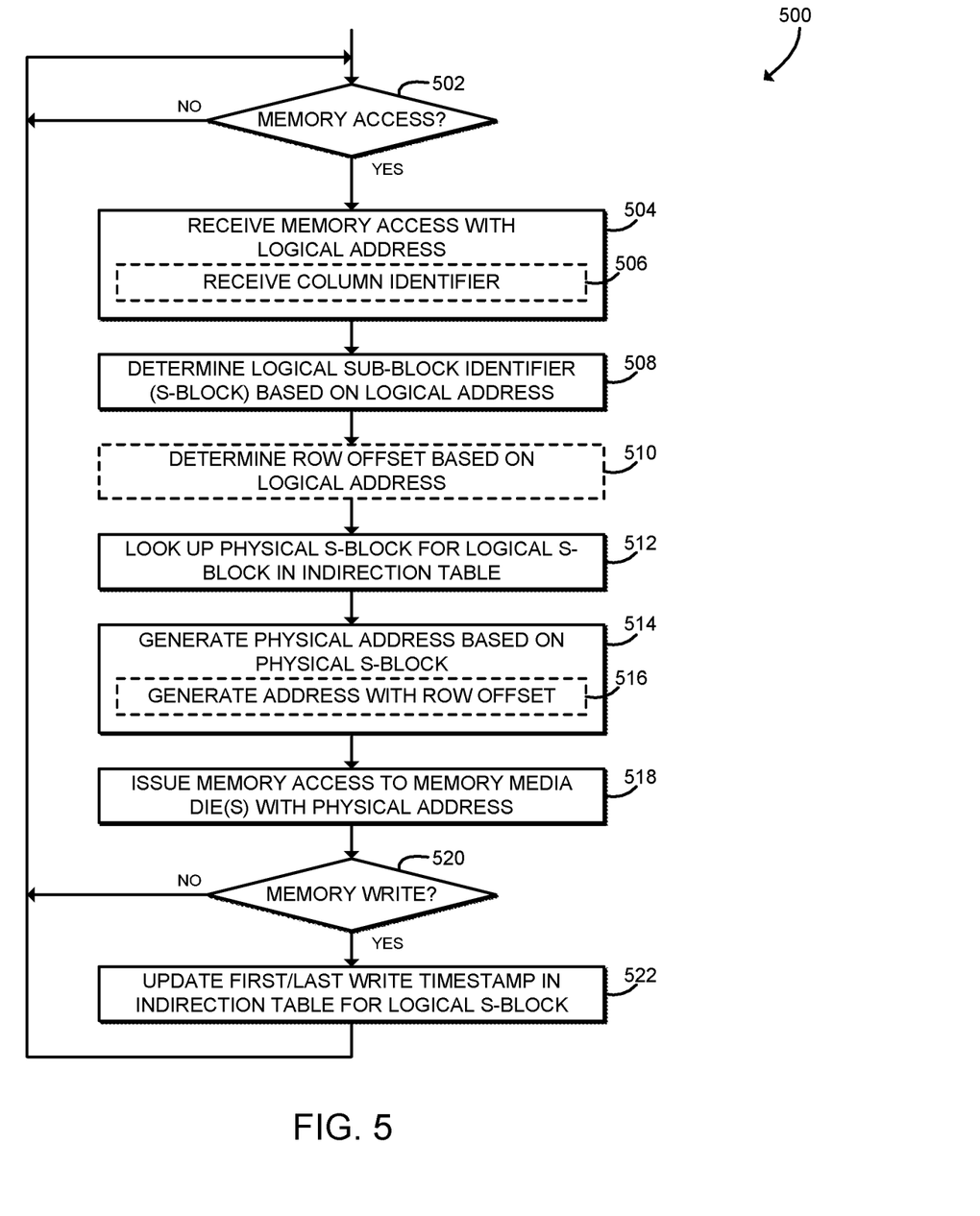
FIG. 5 is a simplified flow diagram of at least one embodiment of a method for memory access indirection that may be performed by a memory controller of the compute device of FIG. 1.

Referring now to FIG. 5, the compute device 100, in operation, may execute a method 500 for memory access indirection. The method 500 is described with reference to the memory 104. However, it should be understood that the method 500 could be performed additionally or alternatively using the data storage device 114. The method 500 begins with block 502 in which the memory controller 106 determines whether to perform a memory access. If not, the method 500 loops back to block 502 to continue monitoring for memory accesses. If the memory controller 106 determines to perform a memory access, the method 500 advances to block 504.

In block 504, the memory controller 106 receives a memory access that includes a logical address. For example, the memory controller 106 may receive a memory access request (e.g., a read or write) from the host processor 102. In some embodiments, a memory access may be generated by the vector function unit 130 of the memory controller 106, for exampling in response to a macro command received from the host processor 102. The logical address identifies a logical row in the memory 104 and may be embodied as an integer value or other identifier. In some embodiments, in block 506 the memory controller 106 may receive a column identifier associated with the memory access. For example, the memory controller 106 may receive a column read that identifies a column number.

In block 508, the memory controller 106 determines a logical sub-block (s-block) identifier based on the logical row address. As described above, each s-block is a contiguous block of memory having a predetermined number of rows and columns of data. Illustratively, each s-block includes 128 rows and 128 columns of data. The memory controller 106 may determine a logical s-block identifier for the logical s-block that includes the logical row address. For example, the memory controller 106 may divide the logical row address by the number of rows per s-block (e.g., 128). In some embodiments, an equivalent operation may be performed using bitwise operations (e.g., shift operations). In some embodiments, in block 510 the memory controller 106 may determine a row offset within the logical s-block based on the logical row address. For example, the memory controller 106 may determine a row offset for a row-based memory access.

In block 512, the memory controller 106 looks up a physical s-block identifier for the logical s-block identifier in the indirection table 132. For example, the memory controller 106 may index the indirection table 132 with the logical s-block identifier and read the physical s-block identifier from the indirection table 132. Referring now to FIG. 7, diagram 700 shows an illustrative embodiment of the indirection table 132. As shown, each entry (row) in the indirection table 132 includes a logical s-block identifier, a physical s-block identifier, a physical memory row address range, and timestamps for starting and ending writes. The logical s-block identifiers and/or the physical s-block identifiers may be initialized as a linear sequence of identifiers. For example, in the illustrative diagram 700, logical s-block identifier zero corresponds to physical s-block identifier zero, and so on. In use, for example in response to media management operations as described below in connection with FIG. 6, data for a logical s-block may be moved or media managed to a different physical s-block. For example, in the illustrative diagram 700, logical s-block identifier three corresponds to physical s-block identifier seven. The physical row address range may be determined based on the physical s-block identifier, for example by multiplying the physical s-block identifier by the number of rows in each s-block or by performing equivalent bitwise operations. The write timestamps may be updated in response to write operations and are described further below.

Referring again to FIG. 5, in block 514 the memory controller 106 generates a physical address based on the physical s-block identifier. The memory controller 106 may, for example, retrieve the physical address for the physical s-block identifier from the indirection table 132. Additionally or alternatively, the memory controller 106 may calculate the physical address based on the physical s-block identifier, for example by multiplying the physical s-block identifier by the number of rows in each s-block or by performing equivalent bitwise operations. In some embodiments, in block 516 the memory controller 106 may generate the physical address with the row offset determined as described above in connection with block 510. For example, the memory controller 106 may add the row offset to a base address of the physical s-block or otherwise generate the physical row address.

In block 518, the memory controller 106 issues a memory access to one or more dies of the memory media 110 with the physical address. The memory access may be, for example, a read or a write and may be row-based or column-based. The memory controller 106 may issue the same memory access to multiple dies in the memory media 110, for example using a single command/address bus. Additionally or alternatively, in some embodiments the memory controller 106 may issue the memory access to a single die. In response to receiving the memory access from the memory controller 106, the memory media 110 (and/or the media access circuitry 108) performs the requested memory operation.

In block 520, the memory controller 106 determines whether a memory write was performed. If not, the method 500 loops back to block 502 to perform additional memory accesses. If the memory controller 106 determines that a memory write was performed, the method 500 advances to block 522.

In block 522, the memory controller 106 updates the first and/or last write timestamp in the indirection table 132 for the affected logical s-block. The memory controller 106 may use any time format or other technique to record the write timestamps. For example, as shown in FIG. 7, the start and end write timestamps may be recorded as time offsets from a reference time T. The write timestamps may be used to adjust certain voltage reference values for memory within the logical s-block depending on the first time and/or the most recent time that data was written to the logical s-block. After updating the indirection table 132, the method 500 loops back to block 502 to perform additional memory accesses.

Figure 6:
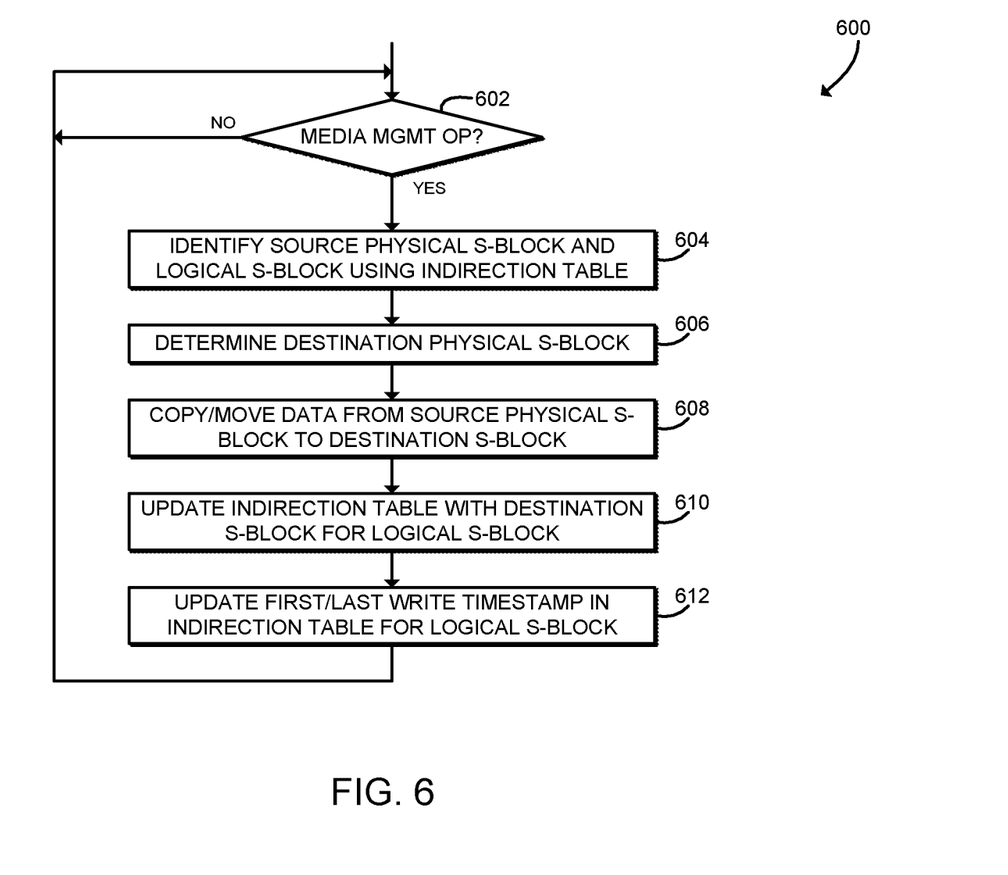
FIG. 6 is a simplified flow diagram of at least one embodiment of a method for memory media management that may be performed by the memory controller of the compute device of FIG. 1.
Figure 7:
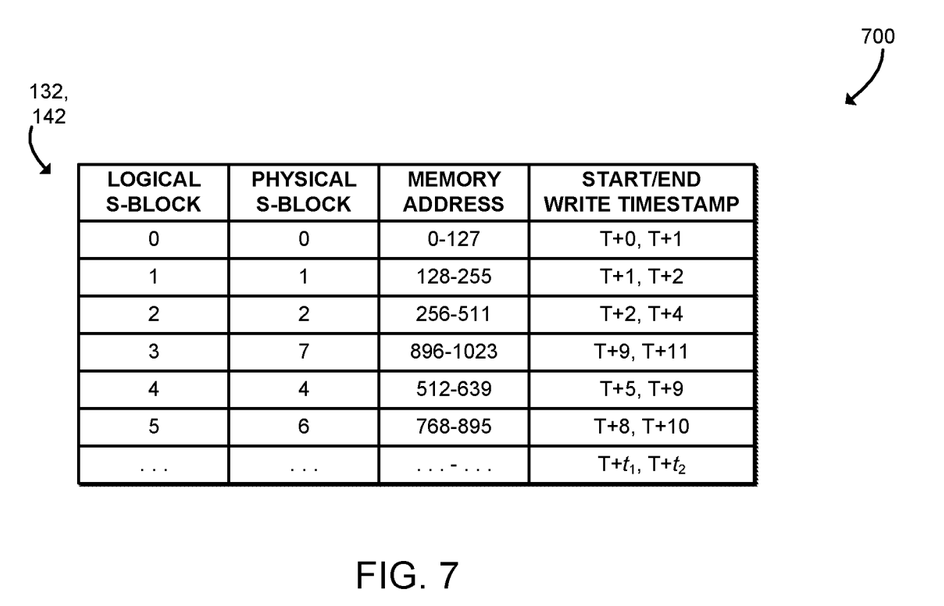
FIG. 7 is a schematic diagram of an indirection table of the memory controller of the compute device of FIG. 1.

Referring now to FIG. 6, the compute device 100, in operation, may execute a method 600 for memory media management. The method 600 is described with reference to the memory 104. However, it should be understood that the method 600 could be performed additionally or alternatively using the data storage device 114. The method 600 begins with block 602 in which the memory controller 106 determines whether to perform a media management operation. The media management operation may include wear leveling (i.e., moving data to another physical location in the memory medium 110 with lower wear) or other memory media-dependent management operations. For example, in some embodiments the memory controller 106 may identify "hot" physical s-blocks for media management operations. Hot physical s-blocks may include memory ranges that have been frequently accessed, memory ranges with certain physical temperature parameters (e.g., temperatures associated with physical state changes), memory ranges requiring data refresh, or other memory ranges requiring media management. If the memory controller 106 determines not to perform a media management operation, the method 600 loops back to block 602 to continue monitoring for media management operations. If the memory controller 106 determines to perform a media management operation, the method 600 advances to block 604.

In block 604, the memory controller 106 identifies a source physical s-block and an associated source logical s-block using the indirection table 132. The source physical s-block may be, for example, a physical s-block that includes a hot memory range determined as described above. The memory controller 106 may search the indirection table 132 to identify the logical s-block identifier associated with the source physical s-block. For example, the memory controller 106 may determine that the memory range 768-895 is hot (e.g., frequency accessed, high in temperature, or otherwise requiring media management). Referring again to FIG. 7, the memory range 768-895 is included in the physical s-block identifier six, which is associated with the logical s-block identifier 5.

Referring back to FIG. 6, in block 606, the memory controller 106 determines a destination physical s-block. The memory controller 106 may use any appropriate technique to identify the destination physical s-block. For example, the memory controller 106 may search for an unused physical s-block identifier using the indirection table 132. In block 608, the memory controller 106 copies and/or moves data from the source physical s-block to the destination physical s-block. For example, referring again to FIG. 7, the memory controller 106 may determine that the physical s-block identifier eight is unused. In that example, the memory controller 106 may copy data from the physical s-block identifier six (memory addresses 768-895) to the physical s-block identifier eight (memory addresses 1024-1151). Data may be copied using row-wise copy operations or any other memory copy operation.

In block 610, the memory controller 106 updates the indirection table 132 with the destination physical s-block identifier for the logical s-block identifier determined as described above in connection with block 604. After updating the indirection table 132, memory accesses processed as described above in connection with the FIG. 5 will access data in the destination physical s-block. Thus, by performing media management operations with an s-block granularity, data stored column-wise in the s-block is not corrupted. For example, referring again to FIG. 7, the entry in the indirection table 132 for the logical sub-block identifier five may be updated to reference the physical s-block identifier eight. In that example, subsequent accesses to the logical s-block identifier five will access the physical s-block identifier eight. Such indirection is transparent to the host processor 102.

In block 612, after updating the physical s-block identifier, the memory controller 106 updates the first and/or last write timestamp in the indirection table 132 for the affected logical s-block. As described above, the memory controller 106 may use any time format or other technique to record the write timestamps. For example, as shown in FIG. 7, the start and end write timestamps may be recorded as time offsets from a reference time T. The write timestamps may be used to adjust certain voltage reference values for memory within the logical s-block depending on the first time and/or most recent time that data was written to the logical s-block. After updating the indirection table 132, the method 600 loops back to block 602 to perform additional media management operations.

Examples

Illustrative examples of the technologies disclosed herein are provided below. An embodiment of the technologies may include any one or more, and any combination of, the examples described below.

Example 1 includes a memory controller comprising: an indirection table; and an indirection unit to: receive a memory access to a column-addressable memory, wherein the memory access is indicative of a memory row address; determine a logical sub-block identifier as a function of the memory row address; look up a physical sub-block identifier based on the logical sub-block identifier in the indirection table; and issue a redirected memory access to the column-addressable memory, wherein the redirected memory access is indicative of the physical sub-block identifier.

Example 2 includes the subject matter of Example 1, and wherein: the indirection unit is further to determine a physical memory row address as a function of the physical sub-block identifier; and the redirected memory access is indicative of the physical memory row address.

Example 3 includes the subject matter of any of Examples 1 and 2, and wherein: the indirection unit is further to determine a row offset as a function of the memory row address; and to determine the physical memory row address further comprises to determine the physical memory row address as a function of the memory row offset.

Example 4 includes the subject matter of any of Examples 1-3, and wherein the physical sub-block identifier is indicative of a contiguous block of memory of the column-addressable memory having a predetermined number of memory rows and a predetermined number of columns.

Example 5 includes the subject matter of any of Examples 1-4, and wherein the predetermined number of memory rows is 128 and the predetermined number of columns is 128.

Example 6 includes the subject matter of any of Examples 1-5, and wherein to issue the redirected memory access to the column-addressable memory comprises to issue the redirected memory access to a die of a memory media of the column-addressable memory.

Example 7 includes the subject matter of any of Examples 1-6, and wherein to issue the redirected memory access to the column-addressable memory further comprises to issue the redirected memory access to a plurality of dies of a memory media of the column-addressable memory.

Example 8 includes the subject matter of any of Examples 1-7, and wherein the memory access comprises a column read.

Example 9 includes the subject matter of any of Examples 1-8, and wherein the indirection unit is further to update the indirection table with a write timestamp associated with the physical sub-block identifier in response to issuance of the redirected memory access, wherein the memory access comprises a memory write.

Example 10 includes the subject matter of any of Examples 1-9, and wherein to receive the memory access comprises to receive the memory access from a host processor coupled to the memory controller.

Example 11 includes the subject matter of any of Examples 1-10, and further comprising a vector function unit to issue the memory access; wherein to receive the memory access comprises to receive the memory access from the vector function unit.

Example 12 includes the subject matter of any of Examples 1-11, and wherein the column-addressable memory comprises a memory media with a cross point architecture in which memory cells are positioned at intersections of word lines and bit lines and are individually addressable.

Example 13 includes the subject matter of any of Examples 1-12, and wherein the memory controller is coupled to the memory media via a media access circuit.

Example 14 includes a memory controller comprising: an indirection table; and a media management unit to: identify a source physical sub-block identifier and a destination physical sub-block identifier for a media management operation associated with a column-addressable memory; identify a logical sub-block identifier associated with the source physical sub-block identifier with the indirection table; perform the media management operation; and update the indirection table with the destination physical sub-block identifier for the logical sub-block identifier in response to performance of the media management operation.

Example 15 includes the subject matter of Example 14, and wherein each physical sub-block identifier is indicative of a contiguous block of memory of the column-addressable memory having a predetermined number of memory rows and a predetermined number of columns.

Example 16 includes the subject matter of any of Examples 14 and 15, and wherein the media management unit is further to update the indirection table with a write timestamp associated with the destination physical sub-block identifier in response to the performance of the media management operation.

Example 17 includes the subject matter of any of Examples 14-16, and wherein to perform the media management operation comprises to copy data from a first contiguous block of the column-addressable memory to a second contiguous block of the column-addressable memory, wherein the source physical sub-block identifier is indicative of the first contiguous block and the destination physical sub-block identifier is indicative of the second contiguous block.

Example 18 includes the subject matter of any of Examples 14-17, and wherein the media management operation comprises a wear leveling operation.

Example 19 includes the subject matter of any of Examples 14-18, and wherein the column-addressable memory comprises a memory media with a cross point architecture in which memory cells are positioned at intersections of word lines and bit lines and are individually addressable.

Example 20 includes the subject matter of any of Examples 14-19, and wherein the memory controller is coupled to the memory media via a media access circuit.

Example 21 includes the subject matter of any of Examples 14-20, and further comprising an indirection unit to: receive a memory access to the column-addressable memory in response to performance of the media management operation, wherein the memory access is indicative of a memory row address; determine the logical sub-block identifier as a function of the memory row address; look up the destination physical sub-block identifier based on the logical sub-block identifier in the indirection table; and issue a redirected memory access to the column-addressable memory, wherein the redirected memory access is indicative of the destination physical sub-block identifier.

Example 22 includes a method comprising: receiving, by a memory controller, a memory access to a column-addressable memory, wherein the memory access is indicative of a memory row address; determining, by the memory controller, a logical sub-block identifier as a function of the memory row address; looking up, by the memory controller, a physical sub-block identifier based on the logical sub-block identifier in an indirection table of the memory controller; and issuing, by the memory controller, a redirected memory access to the column-addressable memory, wherein the redirected memory access is indicative of the physical sub-block identifier.

Example 23 includes the subject matter of Example 22, and further comprising: determining, by the memory controller, a physical memory row address as a function of the physical sub-block identifier; wherein the redirected memory access is indicative of the physical memory row address.

Example 24 includes the subject matter of any of Examples 22 and 23, and further comprising: determining, by the memory controller, a row offset as a function of the memory row address; wherein determining the physical memory row address further comprises determining the physical memory row address as a function of the memory row offset.

Example 25 includes the subject matter of any of Examples 22-24, and wherein the physical sub-block identifier is indicative of a contiguous block of memory of the column-addressable memory having a predetermined number of memory rows and a predetermined number of columns.

Example 26 includes the subject matter of any of Examples 22-25, and wherein the predetermined number of memory rows is 128 and the predetermined number of columns is 128.

Example 27 includes the subject matter of any of Examples 22-26, and wherein issuing the redirected memory access to the column-addressable memory comprises issuing the redirected memory access to a die of a memory media of the column-addressable memory.

Example 28 includes the subject matter of any of Examples 22-27, and wherein issuing the redirected memory access to the column-addressable memory further comprises issuing the redirected memory access to a plurality of dies of a memory media of the column-addressable memory.

Example 29 includes the subject matter of any of Examples 22-28, and wherein the memory access comprises a column read.

Example 30 includes the subject matter of any of Examples 22-29, and further comprising updating, by the memory controller, the indirection table with a write timestamp associated with the physical sub-block identifier in response to issuing the redirected memory access, wherein the memory access comprises a memory write.

Example 31 includes the subject matter of any of Examples 22-30, and wherein receiving the memory access comprises receiving the memory access from a host processor coupled to the memory controller.

Example 32 includes the subject matter of any of Examples 22-31, and wherein receiving the memory access comprises receiving the memory access from a vector function unit of the memory controller.

Example 33 includes the subject matter of any of Examples 22-32, and wherein the column-addressable memory comprises a memory media with a cross point architecture in which memory cells are positioned at intersections of word lines and bit lines and are individually addressable.

Example 34 includes the subject matter of any of Examples 22-33, and wherein the memory controller is coupled to the memory media via a media access circuit.

Example 35 includes a method comprising: identifying, by a memory controller of a column-addressable memory, a source physical sub-block identifier and a destination physical sub-block identifier for a media management operation; identifying, by the memory controller, a logical sub-block identifier associated with the source physical sub-block identifier using an indirection table of the memory controller; performing, by the memory controller, the media management operation; and updating, by the memory controller, the indirection table with the destination physical sub-block identifier for the logical sub-block identifier in response to performing the media management operation.

Example 36 includes the subject matter of Example 35, and wherein each physical sub-block identifier is indicative of a contiguous block of memory of the column-addressable memory having a predetermined number of memory rows and a predetermined number of columns.

Example 37 includes the subject matter of any of Examples 35 and 36, and further comprising updating, by the memory controller, the indirection table with a write timestamp associated with the destination physical sub-block identifier in response to performing the media management operation.

Example 38 includes the subject matter of any of Examples 35-37, and wherein performing the media management operation comprises copying data from a first contiguous block of the column-addressable memory to a second contiguous block of the column-addressable memory, wherein the source physical sub-block identifier is indicative of the first contiguous block and the destination physical sub-block identifier is indicative of the second contiguous block.

Example 39 includes the subject matter of any of Examples 35-38, and wherein the media management operation comprises a wear leveling operation.

Example 40 includes the subject matter of any of Examples 35-39, and wherein the column-addressable memory comprises a memory media with a cross point architecture in which memory cells are positioned at intersections of word lines and bit lines and are individually addressable.

Example 41 includes the subject matter of any of Examples 35-40, and wherein the memory controller is coupled to the memory media via a media access circuit.

Example 42 includes the subject matter of any of Examples 35-41, and further comprising: receiving, by the memory controller, a memory access to the column-addressable memory in response to performing the media management operation, wherein the memory access is indicative of a memory row address; determining, by the memory controller, the logical sub-block identifier as a function of the memory row address; looking up, by the memory controller, the destination physical sub-block identifier based on the logical sub-block identifier in the indirection table; and issuing, by the memory controller, a redirected memory access to the column-addressable memory, wherein the redirected memory access is indicative of the destination physical sub-block identifier.

Example 43 includes a computing device comprising: a processor; and a memory having stored therein a plurality of instructions that when executed by the processor cause the computing device to perform the method of any of Examples 22-42.

Example 44 includes one or more machine readable storage media comprising a plurality of instructions stored thereon that in response to being executed result in a computing device performing the method of any of Examples 22-42.

Example 45 includes a computing device comprising means for performing the method of any of Examples 22-42.

Example 46 includes a compute device comprising a data storage device comprising a column-addressable memory media and a memory controller, the memory controller comprising: an indirection table; and an indirection unit to (i) receive a memory access to the column-addressable memory media, wherein the memory access is indicative of a memory row address, (ii) determine a logical sub-block identifier as a function of the memory row address, (iii) look up a physical sub-block identifier based on the logical sub-block identifier in the indirection table, and (iv) issue a redirected memory access to the column-addressable memory media, wherein the redirected memory access is indicative of the physical sub-block identifier.

Example 47 includes the subject matter of Example 46, and further comprising a host processor and an I/O subsystem, wherein the host processor is coupled to the data storage device via the I/O subsystem.

Example 48 includes the subject matter of any of Examples 46 and 47, and wherein to receive the memory access comprises to receive the memory access from the host processor.

Example 49 includes the subject matter of any of Examples 46-48, and further comprising a host processor, wherein the data storage device comprises a persistent memory device coupled to the host processor.

Example 50 includes the subject matter of any of Examples 46-49, and wherein the data storage device further includes a media access circuit, and wherein the memory controller is coupled to the column-addressable memory media via the media access circuit.

Example 51 includes the subject matter of any of Examples 46-50, and wherein the memory controller further comprises a media management unit to identify a source physical sub-block identifier and a destination physical sub-block identifier for a media management operation associated with the column-addressable memory media; identify the logical sub-block identifier associated with the source physical sub-block identifier with the indirection table; perform the media management operation; and update the indirection table with the destination physical sub-block identifier for the logical sub-block identifier in response to performance of the media management operation.

The invention claimed is:
1. A memory controller comprising:
an indirection table; and
an indirection unit to:
  receive a memory access to a column-addressable memory, wherein the memory access includes a logical address, and wherein a column identifier is excluded from the logical address and the logical address identifies a logical row in the column-addressable memory that is indicative of a memory row address for row-based memory access of the column-addressable memory;
  determine a logical sub-block identifier as a function of the memory row address;
  look up a physical sub-block identifier based on the logical sub-block identifier in the indirection table; and
  issue a redirected memory access to the column-addressable memory, wherein the redirected memory access is indicative of the physical sub-block identifier, and wherein each bit of a first logical column of a plurality of logical columns is located in a different physical row and located in a different physical column than any other bit in the first logical column.
2. The memory controller of claim 1, wherein:
the indirection unit is further to determine a physical memory row address as a function of the physical sub-block identifier; and
the redirected memory access is indicative of the physical memory row address.
3. The memory controller of claim 2, wherein:
the indirection unit is further to determine a row offset as a function of the memory row address; and
to determine the physical memory row address further comprises to determine the physical memory row address as a function of the memory row offset.
4. The memory controller of claim 1, wherein the physical sub-block identifier is indicative of a contiguous block of memory of the column-addressable memory having a predetermined number of memory rows and a predetermined number of columns.
5. The memory controller of claim 4, wherein the predetermined number of memory rows is 128 and the predetermined number of columns is 128.
6. The memory controller of claim 1, wherein to issue the redirected memory access to the column-addressable memory comprises to issue the redirected memory access to a die of a memory media of the column-addressable memory.
7. The memory controller of claim 1, wherein to issue the redirected memory access to the column-addressable memory further comprises to issue the redirected memory access to a plurality of dies of a memory media of the column-addressable memory.
8. The memory controller of claim 1, wherein the memory access comprises a column read.
9. The memory controller of claim 1, wherein the indirection unit is further to update the indirection table with a write timestamp associated with the physical sub-block identifier in response to issuance of the redirected memory access, wherein the memory access comprises a memory write.
10. The memory controller of claim 1, wherein to receive the memory access comprises to receive the memory access from a host processor coupled to the memory controller.
11. The memory controller of claim 1, further comprising a vector function unit to issue the memory access;
  wherein to receive the memory access comprises to receive the memory access from the vector function unit.
12. The memory controller of claim 1, wherein the column-addressable memory comprises a memory media with a cross point architecture in which memory cells are positioned at intersections of word lines and bit lines and are individually addressable.
13. The memory controller of claim 12, wherein the memory controller is coupled to the memory media via a media access circuit.
14. One or more non-transitory machine-readable storage media comprising a plurality of instructions stored thereon that, in response to being executed, cause a memory controller to:
  receive a memory access to a column-addressable memory, wherein the memory access includes a logical address and wherein a column identifier is excluded from the logical address and the logical address identifies a logical row in the column-addressable memory that is indicative of a memory row address for row-based memory access of the column-addressable memory;
  determine a logical sub-block identifier as a function of the memory row address;
  look up a physical sub-block identifier based on the logical sub-block identifier in an indirection table of the memory controller; and issue a redirected memory access to the column-addressable memory, wherein the redirected memory access is indicative of the physical sub-block identifier, and wherein each bit of a first logical column of a plurality of logical columns is located in a different physical row and located in a different physical column than any other bit in the first logical column.

15. A memory controller comprising:
an indirection table; and
a media management unit to:
  receive a memory access to a column-addressable memory, wherein the memory access includes a logical address, and wherein a column identifier is excluded from the logical address and the logical address identifies a logical row in the column-addressable memory that is indicative of a memory row address for row-based memory access of the column-addressable memory;
  identify a source physical sub-block identifier and a destination physical sub-block identifier for a media management operation associated with the column-addressable memory a function of the memory row address;
  identify a logical sub-block identifier associated with the source physical sub-block identifier with the indirection table;
  perform the media management operation; and
  update the indirection table with the destination physical sub-block identifier for the logical sub-block identifier in response to performance of the media management operation, and wherein each bit of a first logical column of a plurality of logical columns is located in a different physical row and located in a different physical column than any other bit in the first logical column.

16. The memory controller of claim 15, wherein to perform the media management operation comprises to copy data from a first contiguous block of the column-addressable memory to a second contiguous block of the column-addressable memory, wherein the source physical sub-block identifier is indicative of the first contiguous block and the destination physical sub-block identifier is indicative of the second contiguous block.

17. The memory controller of claim 15, wherein the media management operation comprises a wear leveling operation.

18. The memory controller of claim 15, further comprising an indirection unit to:
  receive a memory access to the column-addressable memory in response to performance of the media management operation, wherein the memory access is indicative of a memory row address;
  determine the logical sub-block identifier as a function of the memory row address;
  look up the destination physical sub-block identifier based on the logical sub-block identifier in the indirection table; and
  issue a redirected memory access to the column-addressable memory, wherein the redirected memory access is indicative of the destination physical sub-block identifier.

19. A compute device comprising:
a data storage device comprising a column-addressable memory media and a memory controller, the memory controller comprising:
  an indirection table; and
  an indirection unit to (i) receive a memory access to the column-addressable memory media, wherein the memory access includes a logical address, and wherein a column identifier is excluded from the logical address and the logical address identifies a logical row in the column-addressable memory that is indicative of a memory row address for row-based memory access of the column-addressable memory, (ii) determine a logical sub-block identifier as a function of the memory row address, (iii) look up a physical sub-block identifier based on the logical sub-block identifier in the indirection table, and (iv) issue a redirected memory access to the column-addressable memory media, wherein the redirected memory access is indicative of the physical sub-block identifier, and wherein each bit of a first logical column of a plurality of logical columns is located in a different physical row and located in a different physical column than any other bit in the first logical column.

20. The compute device of claim 19, further comprising a host processor and an I/O subsystem, wherein the host processor is coupled to the data storage device via the I/O subsystem.

21. The compute device of claim 20, wherein to receive the memory access comprises to receive the memory access from the host processor.

22. The compute device of claim 19, further comprising a host processor, wherein the data storage device comprises a persistent memory device coupled to the host processor.

23. The compute device of claim 19, wherein the data storage device further includes a media access circuit, and wherein the memory controller is coupled to the column-addressable memory media via the media access circuit.

24. The compute device of claim 19, wherein the memory controller further comprises a media management unit to:
  identify a source physical sub-block identifier and a destination physical sub-block identifier for a media management operation associated with the column-addressable memory media;
  identify the logical sub-block identifier associated with the source physical sub-block identifier with the indirection table;
  perform the media management operation; and
  update the indirection table with the destination physical sub-block identifier for the logical sub-block identifier in response to performance of the media management operation.

* * * * *

UNITED STATES PATENT AND TRADEMARK OFFICE
CERTIFICATE OF CORRECTION

PATENT NO. : 11,573,735 B2
APPLICATION NO. : 16/854392
DATED : February 7, 2023
INVENTOR(S) : Rowel Garcia, Jawad Khan and Richard Mangold It is certified that error appears in the above-identified patent and that said Letters Patent is hereby corrected as shown below:

In the Claims

Column 16, Line 57, Claim 14, after "address", insert --,--.

Signed and Sealed this
Eighth Day of August, 2023

Katherine Kelly Vidal
*Director of the United States Patent and Trademark Office*